United States Patent
Johansen et al.

(10) Patent No.: US 11,037,233 B1
(45) Date of Patent: Jun. 15, 2021

(54) PERSONALIZED FINANCIAL ACCOUNT STATEMENT

(71) Applicant: Wells Fargo Bank, N.A., San Francisco, CA (US)

(72) Inventors: Joseph Neil Johansen, Rock Hill, SC (US); Leonardo E. Gonzalez, Charlotte, NC (US); Patrick L. Wilde, Charlotte, NC (US); Christian P. Krobisch, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 75 days.

(21) Appl. No.: 15/915,848

(22) Filed: Mar. 8, 2018

(51) Int. Cl.
*G06Q 40/02* (2012.01)

(52) U.S. Cl.
CPC .................................. *G06Q 40/02* (2013.01)

(58) Field of Classification Search
None
See application file for complete search history.

(56) References Cited

U.S. PATENT DOCUMENTS

| | | | |
|---|---|---|---|
| 8,200,562 B2 * | 6/2012 | Sheridan | G06Q 40/06 705/36 R |
| 8,572,646 B2 | 10/2013 | Haberman et al. | |
| 8,671,045 B2 * | 3/2014 | O'Connor | G06Q 40/06 705/35 |
| 9,204,181 B2 | 12/2015 | Ress et al. | |
| 9,294,795 B2 | 3/2016 | McDonough et al. | |
| 2004/0054610 A1 * | 3/2004 | Amstutz | G06Q 40/06 705/36 R |
| 2005/0144096 A1 * | 6/2005 | Caramanna, II | G06Q 40/12 705/30 |
| 2010/0262992 A1 | 10/2010 | Casagrande | |
| 2014/0081846 A1 | 3/2014 | Gallagher et al. | |

* cited by examiner

*Primary Examiner* — Paul Danneman
(74) *Attorney, Agent, or Firm* — Schwegman Lundberg & Woessner, P.A.

(57) ABSTRACT

Various examples described herein are directed to systems and methods for generating a financial account statement. First financial data associated with a first financial account statement for a customer is received. Second financial data associated with a second financial account statement for the customer is received. The first financial data may be from an earlier financial account statement. Changes between the first financial data and the second financial data are determined. Highlighted changes to augment based on preferences of the customer and the determined changes are determined. Content associated with the highlighted changes is determined. The second financial account statement is created based on the second financial data. The content associated with the highlighted changes is linked in the second financial account statement.

17 Claims, 5 Drawing Sheets

PERSONALIZED FINANCIAL ACCOUNT STATEMENT

BACKGROUND

Financial account statements contain a wealth of information for customers. As a static document, highlighting important information in a series of financial account statements can be difficult. Financial account statements, generally, have a consistent look and feel, to help customers quickly compare and find relevant data. Changes in a customer's data between different financial account statements, however, may be difficult to highlight and provide additional information within the consistent look and feel of the financial account statement.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Changes in account values, asset allocation, regulations, etc., may occur between previous and current financial account statements. Highlighting these changes for a customer in their financial account statement may be useful for the customer. Highlighting the changes may include providing the customer with additional information regarding the changes. In an example, the financial account statement has a format that remains consistent. For example, the financial account statement may start with an account summary section, followed by an asset allocation section, etc. The look and feel of these sections may be consistent and provide the same type of information for each financial account statement. The look and feel of the financial account statement may limit the ability to add explanations and additional information regarding relevant changes to the financial account statement. Links within the financial account statement to additional content may be provided without significantly changing the look and feel of the financial account statement.

The content linked within a financial account statement may be relevant to changes from previous financial account statements. For example, changes in account values, asset class values, allocations, etc., may be used to determine relevant content to link to within the financial account statement. In addition, the content may be generated specifically for the customer based on these changes. Linking to this content allows personalized information to be easily accessed by the customer without changing the overall look and feel of the financial account statement.

Figure 1:
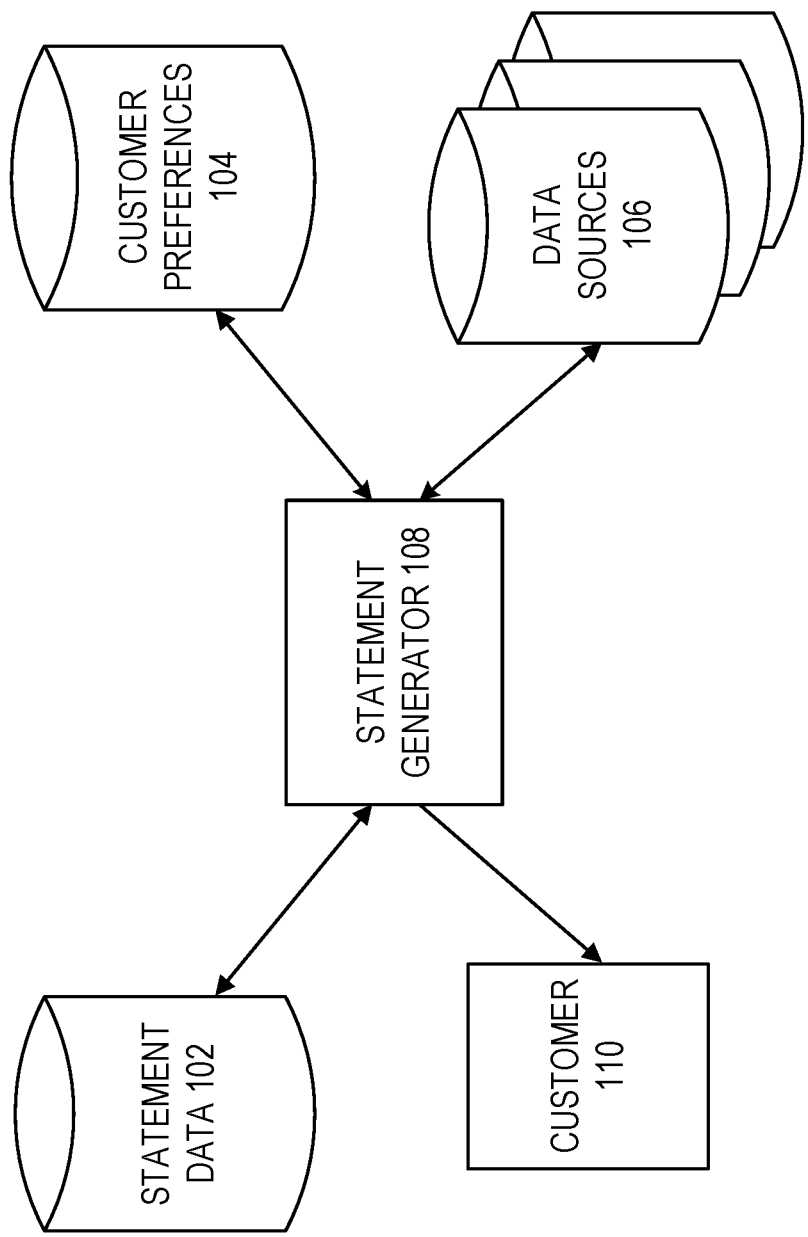
FIG. 1 is a block diagram showing a financial account statement generation system according to some embodiments.

FIG. 1 is a block diagram showing a financial account statement generation system according to some embodiments. A statement generator 108 generates financial account statements for customers. The statement generator 108 may be implemented on the software architecture described below in FIG. 4 and executed on computer hardware, such as the computer hardware in FIG. 5. Accordingly, the structure of the statement generator 108 is described in greater detail below in FIG. 4 and/or FIG. 5. Statement data 102 is used to determine the financial content of a financial account statement. Statement data may include a customer's asset holdings, the value of those assets, and historical financial account statement information. For example, the statement data 102 may include a customer's portfolio value, asset holdings, asset values, etc., from previous account statements. This historical information may be used to determine changes to the customer's account that is used to determine and/or create content to link to in a financial account statement.

The statement generator 108 may access the historical and current account information from the statement data 102. For example, the previous financial account statement data and/or financial account statement data from a year ago may be retrieved. Changes between the current account information and the previous financial account statement data may be determined. The statement generator 108 may then uses these changes to determine if there is additional customer relevant information to include on the current financial account statement.

The statement generator 108 may use customer preferences 104 to determine information that would be relevant to a customer 110. For example, the customer preferences 104 may include information such as a customer's financial goals, life goals, current savings stage, etc. Life goals may include having children, getting married, retiring, going to college, buying a home, etc. Financial goals may include a desired retirement amount, a desired savings amount, etc. A current savings stage may indicate if the customer is accumulating savings or is actively withdrawing from savings.

The statement generator 108 may combine the changes from the financial account data and the customer's preference to determine relevant content for the customer's financial account statement. For example, the statement generator 108 may determine that an asset has changed in value over the last year by more than a predetermined amount. As an example, a security may have increased or decreased in value by more than 5%, 10%, 25%, etc. This change in value may indicate that there is relevant information available to the client. The amount may be specified in the customer preferences 104. In addition to the change in value, the customer's life goal may be used to determine if content should be included in the financial account summary. For example, the customer 110 may be retired and a decrease in value in the asset may be important for the customer's income.

In an example, when the statement generator 108 determines additional content should be included in the customer's financial account statement, the customer's financial advisor may be sent an alert. The alert may include information regarding why additional content should be included in the financial account statement. For example, the alert may indicate that the customer 110 is retired and the customer's portfolio has decreased 10% over the last year, ignoring the customer's planned withdrawals. In this example, the financial advisor may message the customer 110 based on the customer's preferences. In addition, the financial advisor may record an audio or video message specific to the customer 110 and the customer's change in portfolio value. The message may be stored in a data source 106, such as a database, cloud storage, etc. The statement generator 108 may then include a link to the recorded message in the statement. The link may include text indicating that additional information is available to provide further explanation of the change in value.

In another example, content already stored on the data sources 106 may be searched based on the determined changes. For example, a customer 110 may have their retirement account allocated via an aggressive asset allocation. The statement generator 108 may search the data sources 106 for market analysis for small and mid cap stocks that are owned by the customer 110 or for market analysis on the mid cap and/or small cap markets. In addition, content related to migrating from an aggressive to a more conservative asset allocation may be searched on based on the customer's life goals and/or age. For example, as the customer ages the more likely the financial advisor would advise that the customer be less aggressive in their asset allocation.

Once the statement generator 108 determines the content to include in the financial account statement, the current financial account statement may be generated. The financial account statement may then be sent to the customer 110.

Figure 2:
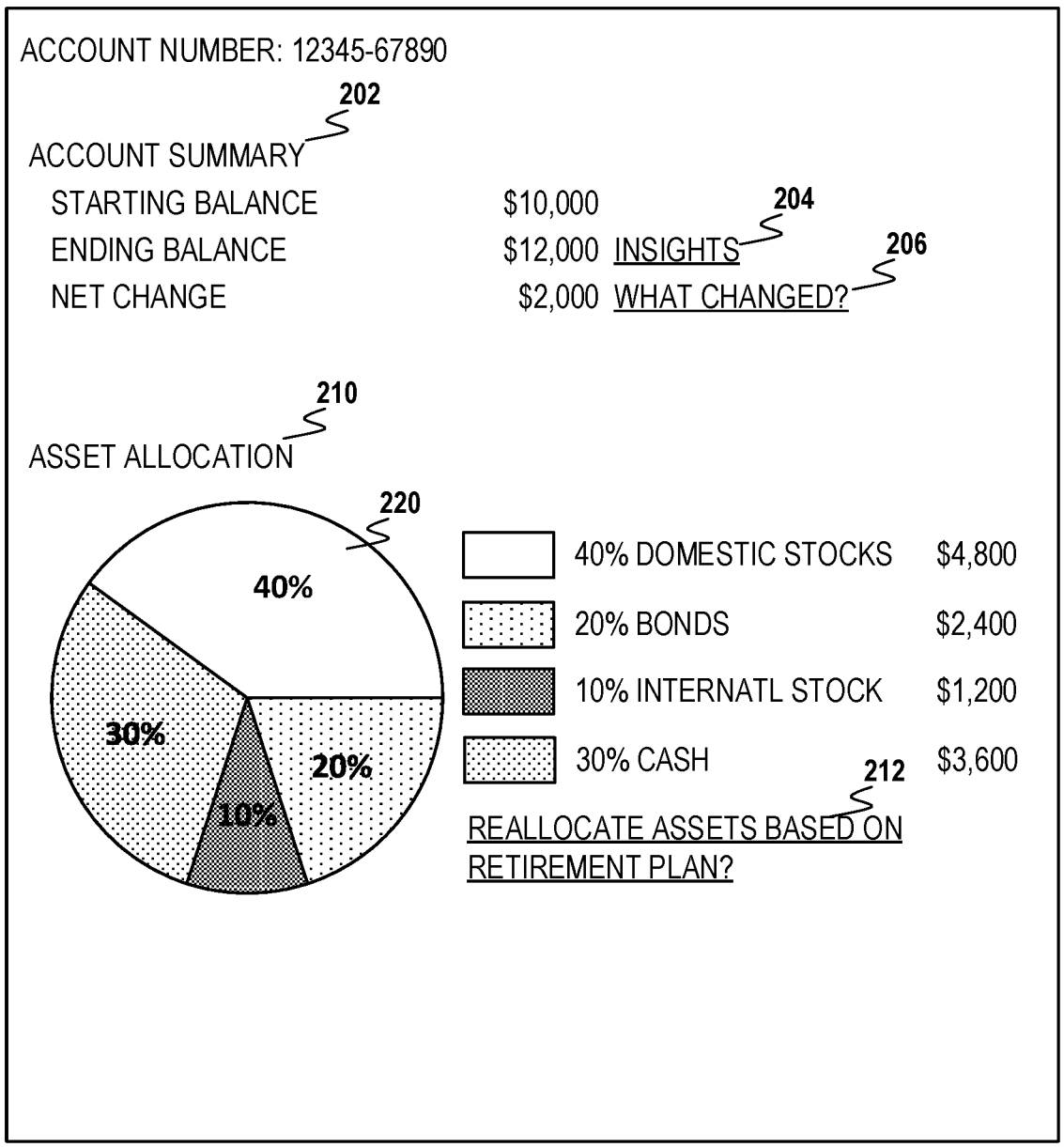
FIG. 2 illustrates a financial account statement with embedded information according to some embodiments.

FIG. 2 illustrates a financial account statement 200 with embedded information according to some embodiments. The financial account statement 200 includes an account summary section 202. The account summary may include information such as the customer's starting balance, ending balance, and net change.

In this example, the statement generator 108 may use the net change to determine additional content to include in the financial account statement 200 that is relevant to the customer. The statement generator 108 determines the ending balance has increased by 20% from the starting balance. Further in this example, the customer preferences indicate that the customer is saving towards a down payment for a home in the next year. Based on the 20% increase, an alert may be sent to the customer's financial advisor who records an audio or video message that lets the customer know they are $2,000 closer to their savings goal. The alert may always include the saving amount goal, the customer's name, etc. that is used to create the message.

Once the video is recorded and stored, the statement generator 108 may search for the video based on a customer identification and time or financial account statement. Finding the recorded video, the statement generator 108 may also retrieve a link address, such as a uniform resource locator (URL), to the video, a statement field identifier that identifies the video is associated with the ending balance, and associated link text. The statement generator 108 may use the look and feel, e.g., a layout, of the financial account statement to determine where to place a link to the record video within the financial account statement 200. The link 204 is shown using the link text associated with the recorded video. The customer may now click on the link 204 to retrieve the personal message recorded by the customer's financial advisor.

In an example, there may be different layouts for the second financial account statement. The layouts may differ in tone and be selected based on customer preferences. For example, a customer that is identified as a collaborator may use one template while a customer that wants financial decisions delegated to the financial advisor uses a different template.

In another example, the financial account statement may be a paper version rather than an electronic version. Accordingly, a link may be substituted with a QR code that will link to the recorded message. The customer may scan the QR code and access their recorded message.

In addition to the link 204, the statement generator 108 may determine additional links to include within the financial account statement 200. For example, the statement generator 108 determines that the customer's account has increased by $2,000 since the last statement. The statement generator 108 may create a message describing what has changed. For example, the statement generator 108 may determine the assets that have increased/decreased in value. For the assets that have increased/decreased by more than a set value, the statement generator 108 may create a message for the customer. For example, the statement generator 108 may create a script that describes how much each asset has changed. As an example, the script may recite in part, "Over the last three months, your ACME corporation holdings increased by $2,100; your ALPHA corporation holdings decreased by $300; and your BETA mutual fund increased by $200." The script may be stored along with an indication that this script is to use voice generation to generate a message when accessed. A link 206 may be provided in the financial account statement to this script. When the link 206 is accessed, a voice generation system uses the script to render audio for the customer. In an example, the customer preferences may be used to determine if the financial advisor is advised to record a message versus using voice generation.

The financial account statement 200 may also include an asset allocation section 210 that shows a customer how their assets are allocated by various classes. A particular asset allocation may be associated with the customer. For example, the customer or their financial advisor may set the asset allocation as part of their customer preferences. As another example, the statement generator 108 may determine a desired asset allocation based on other client preferences. For example, the client preferences may indicate that the customer is retired. The statement generator 108 may use asset allocations for the customer that are determined based on the customer's current retirement savings, the customer's calculated needed retirement savings, and multiple asset allocations associated with retirement and selected by the financial advisor. The statement generator 108 determines the current asset allocations and compares the current asset allocation with the desired asset allocations. If there are any differences between the current asset allocations and the desired asset allocations that are more or less than a predetermined amount, e.g., 5%, 10%, etc., the statement generator 108 may include a link 212 that indicates that reallocation of assets should be done. In an example, the financial advisor may receive an alert that the client may need asset reallocation. Accordingly, providing a link to content explaining various asset allocations as a person moves towards retirement may be searched for and provided in the financial account statement.

The link 212 may be to a service that provides the financial advisor with an indication that the customer would like their assets reallocated. In another example, the link 212 may directly contact the financial advisor. For example, the link 212 may place a call or voice call to the financial advisor. The link 212 may also be to content that discusses the importance of proper asset allocation for a retiree. The statement generator 108 may find this data by searching the data sources 106 for retirement asset allocation information. In another example, the statement generator 108 may create content explaining the customer's ideal asset allocation and which classes of assets should have more/less value. The content may also include what is needed to reallocate the assets and any costs associated with the reallocation. The financial advisor may also be prompted to provide a personalized note for the customer that is incorporated into the content. The content may also include notes from previous customer meetings. For example, the reasons the desired asset allocation was selected may be incorporated. This document may then be stored and accessed by the link 212.

The financial account statement 200 may also include a pie chart 220 associated with the asset allocation. In addition, the financial account statement 200 may include other charts such as a bar chart indicating account value over time. The pie chart 220 may allow the customer to zoom into different parts of the chart 220. For example, the user may be able to zoom into the domestic stocks slice to see an additional chart or information. For example, additional information may include content associated with domestic stocks. In regard to additional charts, a bar chart or another pie chart shows the customer's holdings in all of the domestic stocks may be shown. These charts may also be interactive, allowing the user to select any of the assets. Content associated with the asset may then be shown. For example, links to news related to the asset, messages from the financial advisor, SEC filings, etc., may be shown to the customer.

Figure 3:
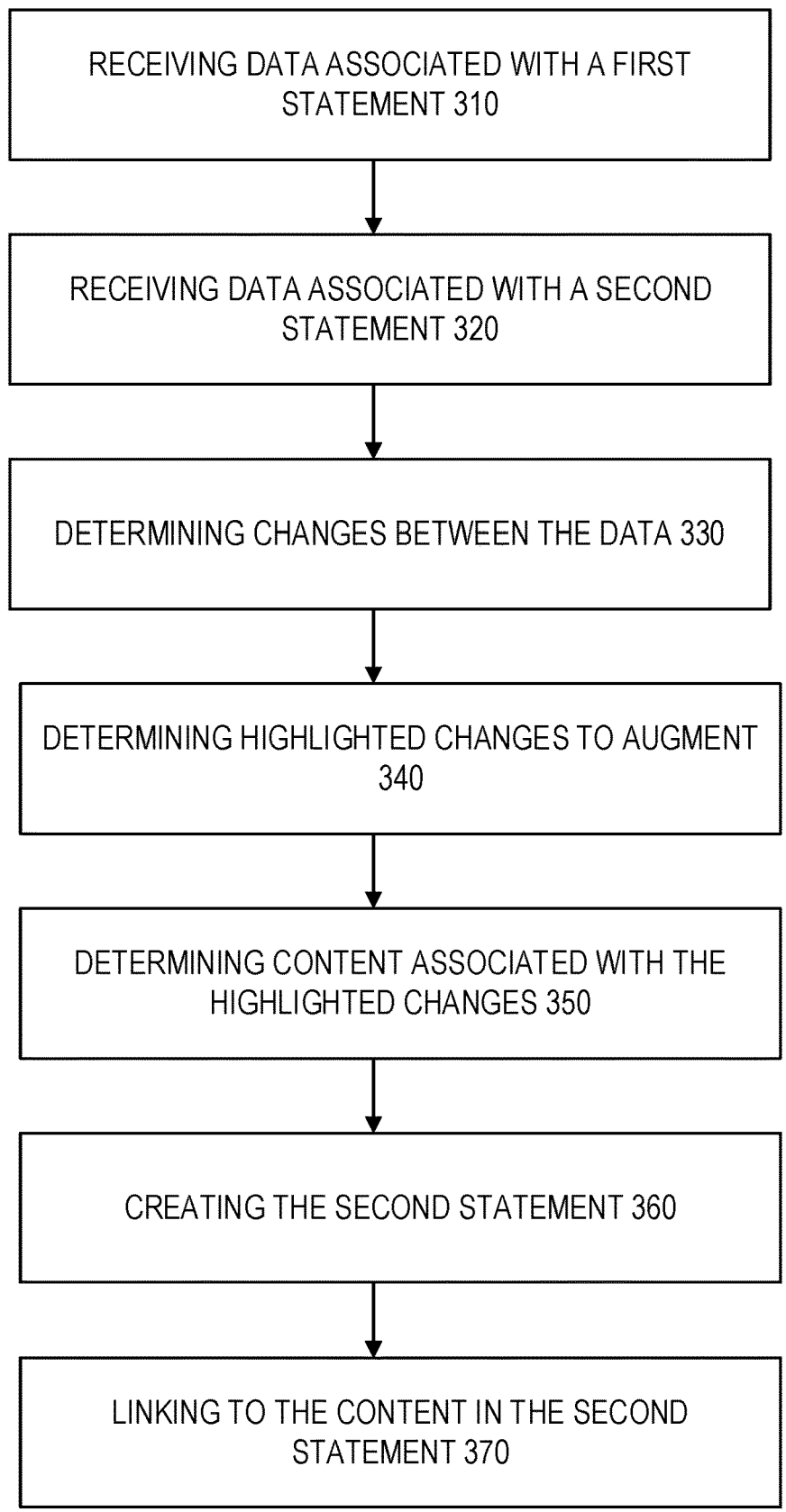
FIG. 3 is a flow diagram showing a financial account statement generation process according to some embodiments.

FIG. 3 is a flow diagram showing a financial account statement generation process according to some embodiments. At 310, first financial data associated with a first financial account statement is received. At 320, second financial data associated with a second financial account statement is received. The financial data may be retrieved from the statement data 102. The financial data is associated with a customer. The first financial account statement may be a prior financial account statement and the second financial account statement may be a financial account statement that is being generated based on the second financial data.

At 330, changes between the financial data is determined. The changes may include a change in account value, a change in an asset value, a change in asset allocation, an asset transferred in, an asset withdrawn, an asset sold, etc. At 340, changes to augment within the second financial account statement are determined. In an example, a change in value of an asset or an account that deviates by more than a predetermined limit, e.g., $100, $500, 5%, etc., is selected to potentially augment. The set amount may be part of the customer's preferences and set by the customer and/or the customer's financial advisor.

Customer preferences may also include life goals, such as retirement, saving an amount of money within a period of time, etc. The life goals may be used to determine a change to augment. For example, the customer's life goals may be retrieved. The customer's life goal may be to save an amount of money within a period of time. The current saving amount may be used to determine if the customer is currently on pace to the meet their saving's goal. A change may include determining the customer is no longer or continues to not be on pace to meet their goal. This change may be a change to highlight to the customer in the second financial account statement.

As another example, customer preferences may indicate that the customer is retired. The current asset allocation of the customer may be determined based on the second financial data. A desired asset allocation may be stored as part of the customer preferences. The current asset allocation may be compared to the desired asset allocation. If any asset class deviates from the desire asset allocation, the change to highlight may include reallocating the customer's assets based on the desired asset allocation.

At 350, content associated with the highlighted changes is determined. In an example, the content may be found by searching data sources 106. In an example, the content may be a recorded audio/video message from the customer's financial advisor. For example, the highlighted change may be assets within an asset class have changed by more than a predetermined amount. Commentary regarding this asset class may be searched for. In another example, the highlighted change may be a change in regulation and content may be found by searching for content related to this change in regulation. For example, a tax regulation may change that affects the customer based on the customer's selling an asset after the previous financial account statement was generated. Content related to the tax consequences may be found and incorporated into the second financial account statement.

At 360, the second financial account statement is generated using the second financial data. For example, the second financial data may be used to generate the second financial account statement. At 370, links to the content are included within the second financial account statement. For example, a URL may be used for electronic versions of the second financial account statement and QR codes may be used for paper versions.

Once the second financial account statement is generated and linked with content, the second financial account statement may be sent to the customer. For example, the second financial account statement may emailed to the customer, made available online, or mailed to the customer.

Figure 4:
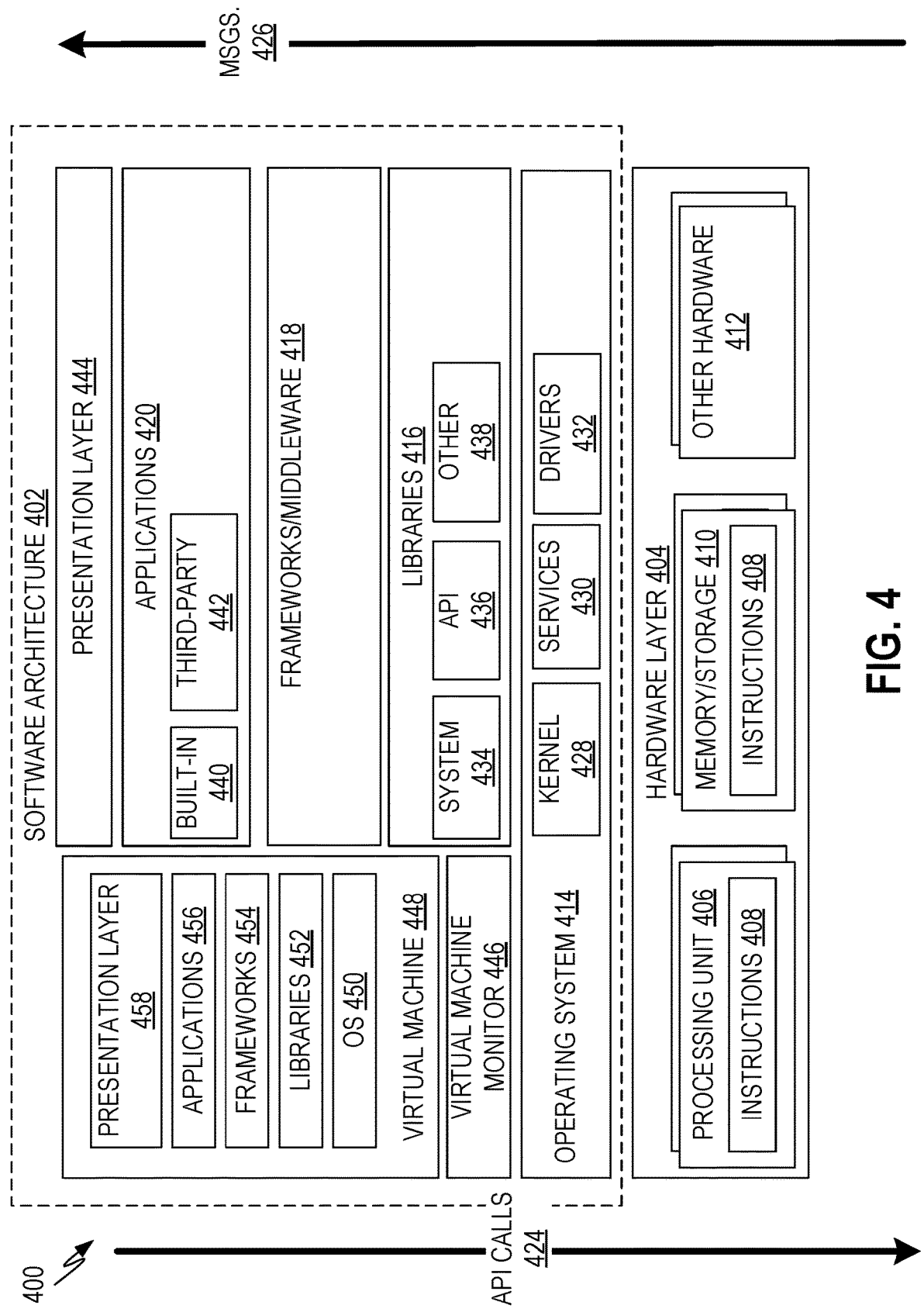
FIG. 4 is a block diagram showing one example of a software architecture for a computing device.

FIG. 4 is a block diagram 400 showing one example of a software architecture 402 for a computing device. The architecture 402 may be used in conjunction with various hardware architectures, for example, as described herein. The software architecture 402 may be used to implement the statement generator 108. FIG. 4 is merely a non-limiting example of a software architecture 402 and many other architectures may be implemented to facilitate the functionality described herein. A representative hardware layer 404 is illustrated and can represent, for example, any of the above referenced computing devices. In some examples, the hardware layer 404 may be implemented according to the architecture 402 of FIG. 4.

The representative hardware layer 404 comprises one or more processing units 406 having associated executable instructions 408. Executable instructions 408 represent the executable instructions of the software architecture 402, including implementation of the methods, modules, components, and so forth of FIGS. 1-3. Hardware layer 404 also includes memory and/or storage modules 410, which also have executable instructions 408. Hardware layer 404 may also comprise other hardware as indicated by other hardware 412 which represents any other hardware of the hardware layer 404, such as the other hardware illustrated as part of hardware architecture 500.

In the example architecture of FIG. 4, the software architecture 402 may be conceptualized as a stack of layers where each layer provides particular functionality. For example, the software architecture 402 may include layers such as an operating system 414, libraries 416, frameworks/middleware 418, applications 420 and presentation layer 444. Operationally, the applications 420 and/or other components within the layers may invoke application programming interface (API) calls 424 through the software stack and receive a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. In some examples, the services 430 include an interrupt service. The interrupt service may detect the receipt of a hardware or software interrupt and, in response, cause the software architecture 402 to pause its current processing and execute an interrupt service routine (ISR) when an interrupt is received. The ISR may generate the alert, for example, as described herein.

The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 416 may provide a common infrastructure that may be utilized by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 and/or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 and/or other software components/modules, some of which may be specific to a particular operating system or platform.

The applications 420 includes built-in applications 440 and/or third party applications 442. Examples of representative built-in applications 440 may include, but are not limited to, a contacts application, a browser application, a book reader application, a location application, a media application, a messaging application, and/or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 442 may invoke the API calls 424 provided by the mobile operating system such as operating system 414 to facilitate functionality described herein.

The applications 420 may utilize built in operating system functions (e.g., kernel 428, services 430 and/or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 4, this is illustrated by virtual machine 448. A virtual machine creates a software environment where applications/modules can execute as if they were executing on a hardware computing device. A virtual machine is hosted by a host operating system (operating system 414) and typically, although not always, has a virtual machine monitor 446, which manages the operation of the virtual machine as well as the interface with the host operating system (i.e., operating system 414). A software architecture executes within the virtual machine such as an operating system 450, libraries 452, frameworks/middleware 454, applications 456 and/or presentation layer 458. These layers of software architecture executing within the virtual machine 448 can be the same as corresponding layers previously described or may be different.

Figure 5:
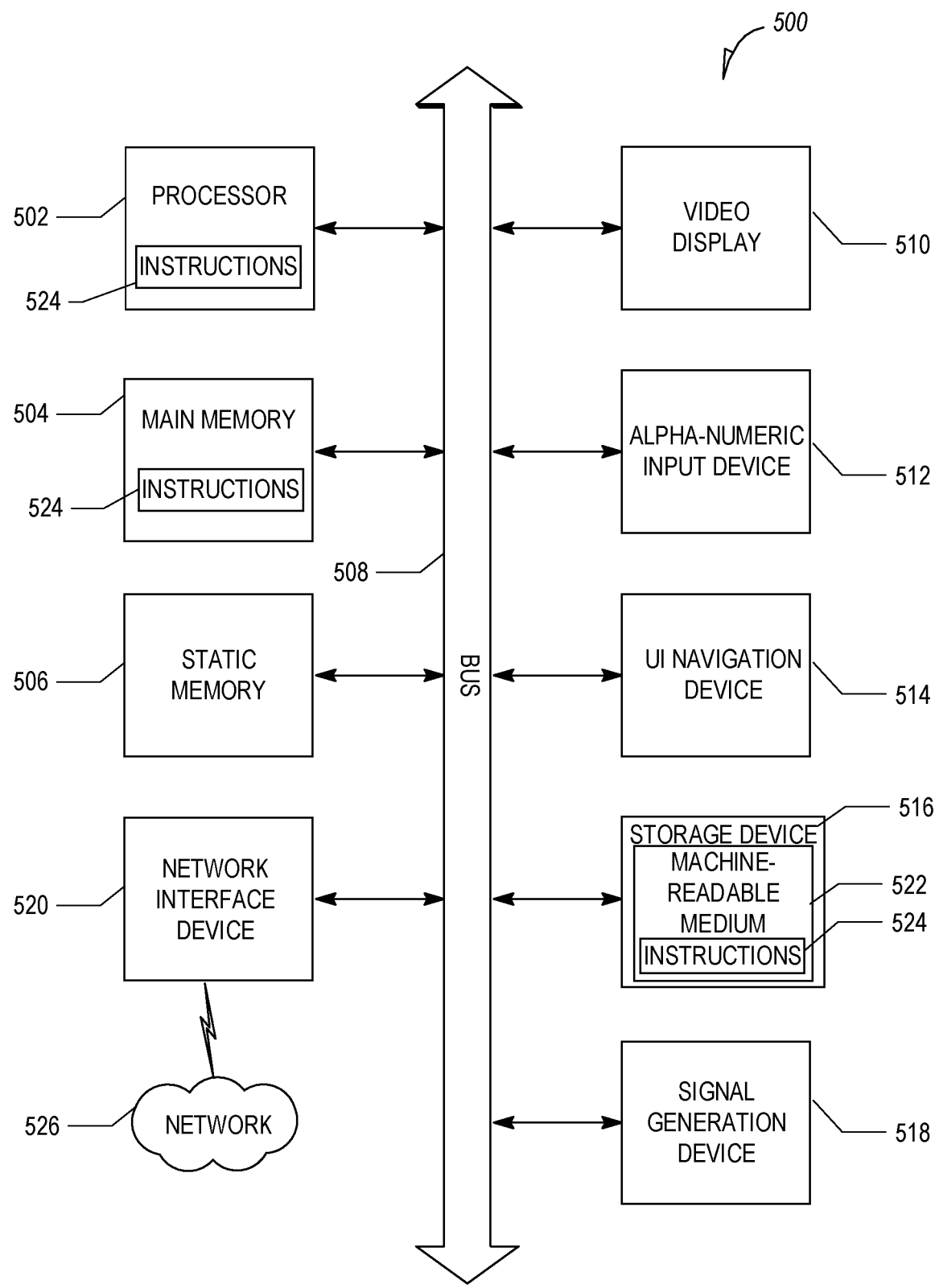
FIG. 5 is a block diagram illustrating a computing device hardware architecture, within which a set or sequence of instructions can be executed to cause the hardware to perform examples of any one of the methodologies discussed herein.

FIG. 5 is a block diagram illustrating a computing device hardware architecture 500, within which a set or sequence of instructions can be executed to cause the machine to perform examples of any one of the methodologies discussed herein. For example, the architecture 500 may execute the software architecture 402 described with respect to FIG. 4. The statement generator 108 may also be executed on the architecture 500. The architecture 500 may operate as a standalone device or may be connected (e.g., networked) to other machines. In a networked deployment, the architecture 500 may operate in the capacity of either a server or a client machine in server-client network environments, or it may act as a peer machine in peer-to-peer (or distributed) network environments. The architecture 500 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 500 includes a processor unit 502 comprising at least one processor (e.g., a central processing unit (CPU), a graphics processing unit (GPU) or both, processor cores, compute nodes, etc.). The architecture 500 may further comprise a main memory 504 and a static memory 506, which communicate with each other via a link 508 (e.g., bus). The architecture 500 can further include a video display unit 510, an alphanumeric input device 512 (e.g., a keyboard), and a user interface (UI) navigation device 514 (e.g., a mouse). In some examples, the video display unit 510, input device 512 and UI navigation device 514 are incorporated into a touch screen display. The architecture 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

In some examples, the processor unit 502 or other suitable hardware component may support a hardware interrupt. In response to a hardware interrupt, the processor unit 502 may pause its processing and execute an interrupt service routine (ISR), for example, as described herein.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the architecture 500, with the main memory 504, static memory 506, and the processor 502 also constituting machine-readable media. Instructions stored at the machine-readable medium 522 may include, for example, instructions for implementing the software architecture 402, instructions for executing any of the features described herein, etc.

While the machine-readable medium 522 is illustrated in an example to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communications networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method, the method comprising operations performed on a statement generator using an electronic processor unit, the operations comprising:
   receiving first financial data associated with a first financial account statement for a customer;
   receiving second financial data associated with a second financial account statement for the customer;
   determining changes between the first financial data and the second financial data that comprise a change of value in an asset;
   determining that the change in value is greater than a predetermined limit;
   determining highlighted changes to augment based on pre-stored preferences of the customer and the determined changes, wherein the predetermined limit is specified in the pre-stored preferences of the customer;
   determining content associated with the highlighted changes, the content being related to a goal of the customer where the highlighted changes comprise a change associated with the goal;
   creating the second financial account statement based on the second financial data; and
   linking the content associated with the highlighted changes to the second financial account statement using an identifier, wherein activation of the identifier provides access to the content associated with the highlighted language changes, wherein the pre-stored preferences of the customer specifies how the content should be rendered and activation of the identifier renders the content according to the pre-stored preferences of the customer.

2. The method of claim 1, further comprising sending the second financial account statement to the customer.

3. The method of claim 1, wherein the determining content comprises:
   determining an asset class of the asset; and
   searching for commentary regarding the asset class, wherein the commentary is the content.

4. The method of claim 1, wherein the determining highlighted changes comprises:
   retrieving a life goal of the customer; and
   determining the change is associated with the life goal.

5. The method of claim 4, wherein the life goal is retirement.

6. The method of claim 5, wherein the determining highlighted changes to augment comprises:
   determining an allocation of assets based on the second financial data; and
   determining that the allocation of assets needs to be reallocated based on the life goal, wherein the highlighted changes comprise the reallocation.

7. The method of claim 4, wherein the life goal is saving an amount of money within a period of time.

8. The method of claim 7, wherein the determining highlighted changes to augment comprises determining a current saving amount is not on pace to meet a goal based on the saving amount and the period of time, wherein the highlighted changes comprise the current saving amount.

9. The method of claim 1, further comprising:
   determining a change in a financial regulation associated with the second financial data, wherein the content comprises content related to the change in the financial regulation.

10. A system comprising:
    a statement generator comprising an electronic processor, the electronic processor configured to:
       receive first financial data associated with a first financial account statement for a customer;
       receive second financial data associated with a second financial account statement for the customer;
       determine changes between the first financial data and the second financial data that comprise a change of value in an asset;
       determine that the change in value is greater than a predetermined limit;
       determine highlighted changes to augment based on pre-stored preferences of the customer and the determined changes, wherein the predetermined limit is specified in the pre-stored preferences of the customer;
       determine content associated with the highlighted changes, the content being related to a goal of the customer where the highlighted changes comprise a change associated with the goal;
       create the second financial account statement based on the second financial data; and
       link the content associated with the highlighted changes to the second financial account statement using an identifier, wherein activation of the identifier provides access to the content associated with the highlighted changes, wherein the pre-stored preferences of the customer specifies how the content should be rendered and activation of the identifier renders the content according to the pre-stored preferences of the customer.

11. The system of claim 10, wherein to determine content the electronic processor is further configured to:
    determine an asset class of the asset; and
    search for commentary regarding the asset class, wherein the commentary is the content.

12. The system of claim 10, wherein to determine highlighted changes the electronic processor is further configured to:
    retrieve a life goal of the customer; and
    determine the change is associated with the life goal.

13. The system of claim 12, wherein the life goal is retirement.

14. The system of claim 13, wherein to determine highlighted changes to augment the electronic processor is further configured to:
    determine an allocation of assets based on the second financial data; and
    determine that the allocation of assets needs to be reallocated based on the life goal, wherein the highlighted changes comprise the reallocation.

15. A non-transitory machine-readable medium, of a statement generator, comprising instructions thereon that, when executed by at least one processor unit, causes the at least one processor unit to perform operations comprising:
    receiving first financial data associated with a first financial account statement for a customer;
    receiving second financial data associated with a second financial account statement for the customer;
    determining changes between the first financial data and the second financial data that comprise a change of value in an asset;
    determining that the change in value is greater than a predetermined limit;
    determining highlighted changes to augment based on pre-stored preferences of the customer and the determined changes, wherein the predetermined limit is specified in the pre-stored preferences of the customer;
    determining content associated with the highlighted changes, the content being related to a goal of the customer where the highlighted changes comprise a change associated with the goal;
    creating the second financial account statement based on the second financial data; and
    linking the content associated with the highlighted changes to the second financial account statement using an identifier, wherein activation of the identifier provides access to the content associated with the highlighted changes, wherein the pre-stored preferences of the customer specifies how the content should be rendered and activation of the identifier renders the content according to the pre-stored preferences of the customer.

16. The non-transitory machine-readable medium of claim 15, wherein the determining content comprises:
    determining an asset class of the asset; and
    searching for commentary regarding the asset class, wherein the commentary is the content.

17. The non-transitory machine-readable medium of claim 15, wherein the determining highlighted changes comprises:
    retrieving a life goal of the customer; and
    determining the change is associated with the life goal.

\* \* \* \* \*

UNITED STATES PATENT AND TRADEMARK OFFICE
CERTIFICATE OF CORRECTION

PATENT NO. : 11,037,233 B1  
APPLICATION NO. : 15/915848  
DATED : June 15, 2021  
INVENTOR(S) : Johansen et al.

Page 1 of 1

It is certified that error appears in the above-identified patent and that said Letters Patent is hereby corrected as shown below:

In the Claims

In Column 11, Line 1, in Claim 1, before "changes,", delete "language"

In Column 11, Line 33, in Claim 9, delete "comprising;" and insert --comprising:-- therefor Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*